(12) United States Patent
Wu et al.

(10) Patent No.: US 12,022,808 B2
(45) Date of Patent: Jul. 2, 2024

(54) AUTOMATIC PET FEEDING DEVICE

(71) Applicant: Shenzhen Ipetmon Creative Technology Co., Ltd., Shenzhen (CN)

(72) Inventors: Danyang Wu, Shenzhen (CN); Huifeng Chen, Shenzhen (CN)

(73) Assignee: Shenzhen Ipetmon Creative Technology Co., Ltd., Shenzhen (CN)

(*) Notice: Subject to any disclaimer, the term of this patent is extended or adjusted under 35 U.S.C. 154(b) by 131 days.

(21) Appl. No.: 17/870,843

(22) Filed: Jul. 22, 2022

(65) Prior Publication Data
US 2023/0180714 A1 Jun. 15, 2023

(30) Foreign Application Priority Data

Dec. 15, 2021 (CN) .......................... 202123143473.1
Jan. 21, 2022 (CN) .......................... 202220162664.8

(51) Int. Cl.
*A01K 5/02* (2006.01)
*A01K 5/01* (2006.01)

(52) U.S. Cl.
CPC .......... *A01K 5/0225* (2013.01); *A01K 5/0114* (2013.01); *A01K 5/0275* (2013.01)

(58) Field of Classification Search
CPC ... A01K 5/0114; A01K 5/0225; A01K 5/0275
USPC .......................................................... 119/57
See application file for complete search history.

(56) References Cited

U.S. PATENT DOCUMENTS

| | | | | |
|---|---|---|---|---|
| 3,434,459 A | * | 3/1969 | Green ................... | A01K 5/0275 119/51.11 |
| 5,365,879 A | * | 11/1994 | Ying-Kuan .......... | A01K 5/0241 119/476 |
| 5,855,300 A | * | 1/1999 | Malki ..................... | G01F 11/18 222/565 |

(Continued)

FOREIGN PATENT DOCUMENTS

| | | | | | |
|---|---|---|---|---|---|
| CN | 109122361 A | * | 1/2019 | ............... | A01K 1/03 |
| DE | 10135740 C1 | * | 2/2003 | ............... | A01K 5/01 |

(Continued)

OTHER PUBLICATIONS

Merriam-Webster, "Integral"; https://www.merriam-webster.com/dictionary/integral (Year: 2024).*

*Primary Examiner* — Tien Q Dinh
*Assistant Examiner* — Erica Michelle Huebner

(57) ABSTRACT

An automatic pet feeding device includes a grain storage bin including a grain leaking member formed at a lower portion thereof and connected with a pushing granary, the pushing granary arranged below the grain storage bin and including a grain delivery member, and a grain pusher slidably arranged between the pushing granary and the grain storage bin; the grain pusher configured to push pet food in the pushing granary out of the grain delivery member, and open or close the grain leaking member and the grain delivery member. The feeding device provides that pet food can flow out of the grain delivery member through the grain pusher, and both the grain leaking member and the grain delivery member can be sealed at the same time, to prevent insects and ants from entering inside the feeding device from the grain delivery member, to breed bacteria and endanger health of pets.

13 Claims, 11 Drawing Sheets

(56) References Cited

U.S. PATENT DOCUMENTS

| 8,656,979 | B2 * | 2/2014 | Tierney | E06B 9/54 |
| | | | | 160/43 |
| 9,848,502 | B1 * | 12/2017 | Chu | E05D 7/00 |
| 2009/0145365 | A1 * | 6/2009 | Mahle | A01K 5/0114 |
| | | | | 119/51.01 |
| 2020/0367469 | A1 * | 11/2020 | Zhu | A01K 5/0291 |

FOREIGN PATENT DOCUMENTS

| FR | 2541863 A1 * | 9/1984 | | |
| WO | WO-0124619 A1 * | 4/2001 | ........... | A01K 5/0291 |
| WO | WO-2015134698 A1 * | 9/2015 | ........... | A01K 5/0114 |

* cited by examiner

AUTOMATIC PET FEEDING DEVICE

BACKGROUND

1. Technical Field

The present disclosure generally relates to the field of pet articles, and especially relates to an automatic pet feeding device.

2. Description of Related Art

At present, a pet feeder in the market mainly opens a food storage bin of the pet feeder by rotating a rotating plate of the pet feeder, so as to flow pet food out of the food storage bin for feeding pets.

For example, a Chinese Patent No. 214853533 entitled "novel automatic feeder", referring to FIG. 1 and FIG. 2, includes a pair of rotating plates 6 is driven by a controller to rotate. During rotating the pair of rotating plates 6, one of the pair of rotating plates 6 extrudes a return spring 11 to open a lower feeding port 7, so that pet food in a food storage box 2 flows out through the lower feeding port 7. When the rotating plate 6 reaches a side of the lower feeding port 7 close to a sliding groove 8, the return spring 11 pushes a blocking plate 9 to close the lower feeding port 7. However, in this technique, the lower feeding port 7 is opened or closed by rotating the blocking plate 9 in the lower feeding port 7, when the pet food flows out of the lower feeding port 7, the lower feeding port 7 is full of pet food, and the blocking plate 9 needs to overcome a resistance of the pet food to close the whole lower feeding port 7. When a weight and a size of the pet food are too large, a problem of grain jamming is occurred, resulting in a phenomenon that the lower feeding port 7 can't be completely closed.

Referring to FIG. 3, another Chinese Patent No. 204796445 U entitled "lower hopper for intelligent pet feeder" discloses that, a bottom plate 13 is arranged on a bottom of a storage bin 1 and includes a feeding port 10 formed thereof, a lower end of a rotating shaft 2 passes through a feeding baffle plate 12, an upper end of the rotating shaft 2 passes through the bottom plate 13 to connect with a rotating cover 7, and the rotating cover 7 includes an upper paddle 4 formed at a left side and a right side thereof, respectively. When the upper paddle 4 rotates, pet food in the storage bin 1 is pushed to flow out from the feeding port 10. In the above technical scheme, when the rotating shaft 2 and the rotating cover 7 rotate, the upper paddle 4 is followed to rotate in the storage bin 1, and it is still impossible to ensure that the pet food filled in both the feeding port 10 and the storage bin 1 isn't blocked between an edge of the feeding port 10 and the upper paddle 4, so it is impossible to completely prevent the pet food from blocking the edge of the feeding port 10 and the upper paddle 4. Simultaneously, the feeding port 10 is always opened, and the pet food will flow out of the storage bin 1 until there is no pet food in the storage bin 1. In this case, it is impossible to neither quantitatively feed the pet food for pets, nor ensure that the pet food in the storage bin 1 will not be polluted by water vapor and bacteria from outside the feeding port 10, resulting in causing mildew, etc., which will affect pet safety.

In another Chinese patent publication No. 106376478 A entitled "pet feeder and pet feeding system" discloses that, a first discharge port is set at a lower end of a storage barrel, and a second motor pushes the pet food from the first discharge port into a feeding rotating wheel, and then the feeding rotating wheel outputs the pet food from a second discharge port of the feeding rotating wheel to a guiding recess until the pet food enters a feeding basin. In this patent, firstly, a plurality of motors, and the feeding rotating wheel taken as an intermediate component are needed to be set, the pet food firstly enters the feeding rotating wheel and then is pushed into an external feeding basin, which has a complex structure and a high cost. Furthermore, when the pet food enters the feeding rotating wheel, a rotating paddle driven by the second motor will also be blocked by the pet food. Moreover, the above patent also does not disclose a sealing structure from the feeding basin to the guiding recess, the feeding rotating wheel and the storage barrel, which can't ensure that an external environment will not pollute the pet food in the storage barrel and affect the health of pets.

SUMMARY

The technical problems to be solved: in view of the shortcomings of the related art, the present disclosure provides an automatic pet feeding device which can solve technical problems that food jam is occurred when the pet food is delivered, and a grain delivery member and a grain storage bin of the automatic pet feeding device can't be closed after delivery of the pet food is finished.

In a first aspect, an automatic pet feeding device according to an embodiment of the present disclosure includes:
- a grain storage bin including a grain leaking member formed at a lower end thereof;
- a pushing granary arranged below the grain storage bin and including a grain delivery member, the pushing granary further in communication with the grain leaking member;
- a grain pusher slidably arranged between the grain storage bin and the pushing granary; and wherein
- the grain pusher is configured to push pet food in the pushing granary out of the grain delivery member, and open or close both the grain leaking member and the grain delivery member; and wherein the feeding device further includes: a grain baffle arranged close to the grain delivery member and configured to open and close the grain delivery member; when the pushing granary is in communication with the grain leaking member, the grain delivery member is closed by the grain baffle, and when the pushing granary is not connected with the grain leaking member, the grain delivery member is opened by the grain baffle; and wherein the grain baffle includes a baffling portion, a rotating portion and a pushing rod, the rotating portion arranged at an end of the baffling portion, and the pushing rod connected to the rotating portion; the rotating portion rotationally arranged at a bottom portion of the pushing granary; the grain pusher including a pushing bar corresponding to the pushing rod; and wherein the pushing bar includes a first pushing portion and a second pushing portion connected with the first pushing portion, the second pushing portion arranged close to the grain delivery member, and a thickness of the second pushing portion that is towards the pushing rod greater than a thickness of the first pushing portion that is towards the pushing rod; the pushing rod including an arc portion arranged close to the grain delivery member, and a flat portion connected with the arc portion.

The present disclosure provides the advantages as below: the present disclosure provides the grain pusher to push the pet food flow out of the grain delivery member, and both the grain leaking member and the grain delivery member can be sealed by the grain pusher, to prevent insects and ants from entering inside the feeding device to breed bacteria and endanger health of pets; in addition, the present disclosure can realize to quantitatively feed pets and ensure healthy and regular diet of the pets.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

Figure 1:
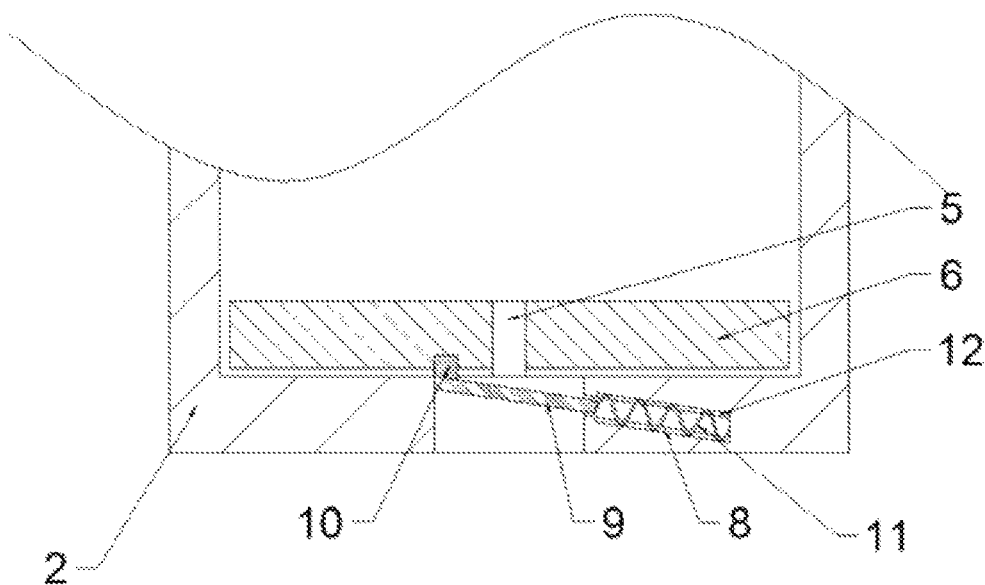
FIG. 1 to FIG. 3 are respectively structural schematic views of pet feeding devices in the related art.
Figure 2:
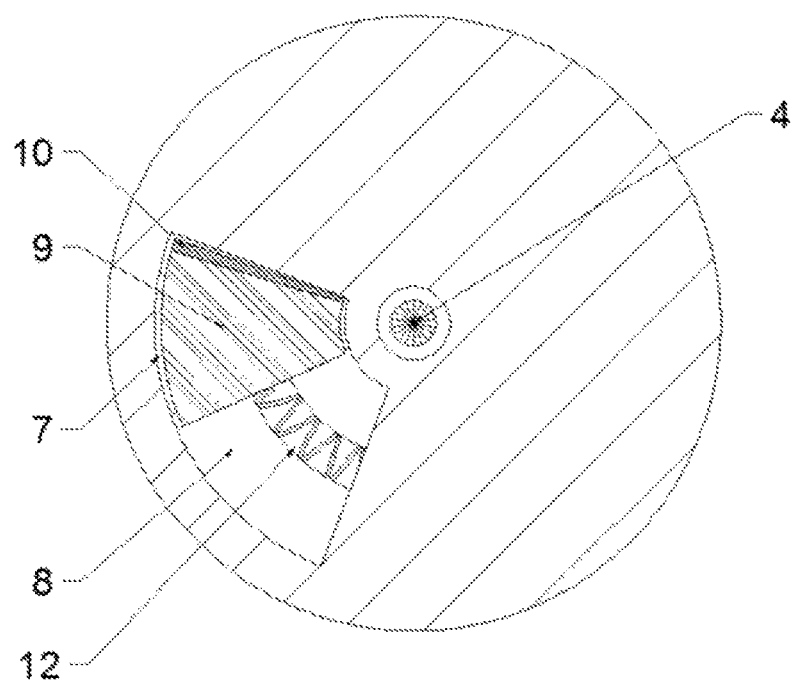
Figure 3:
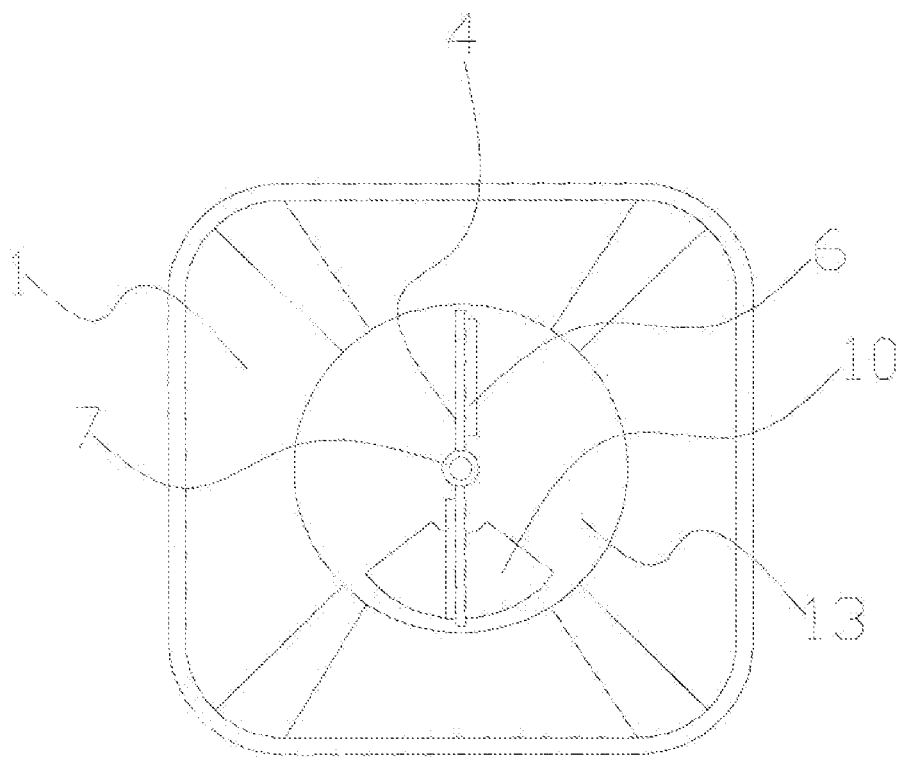
Figure 4:
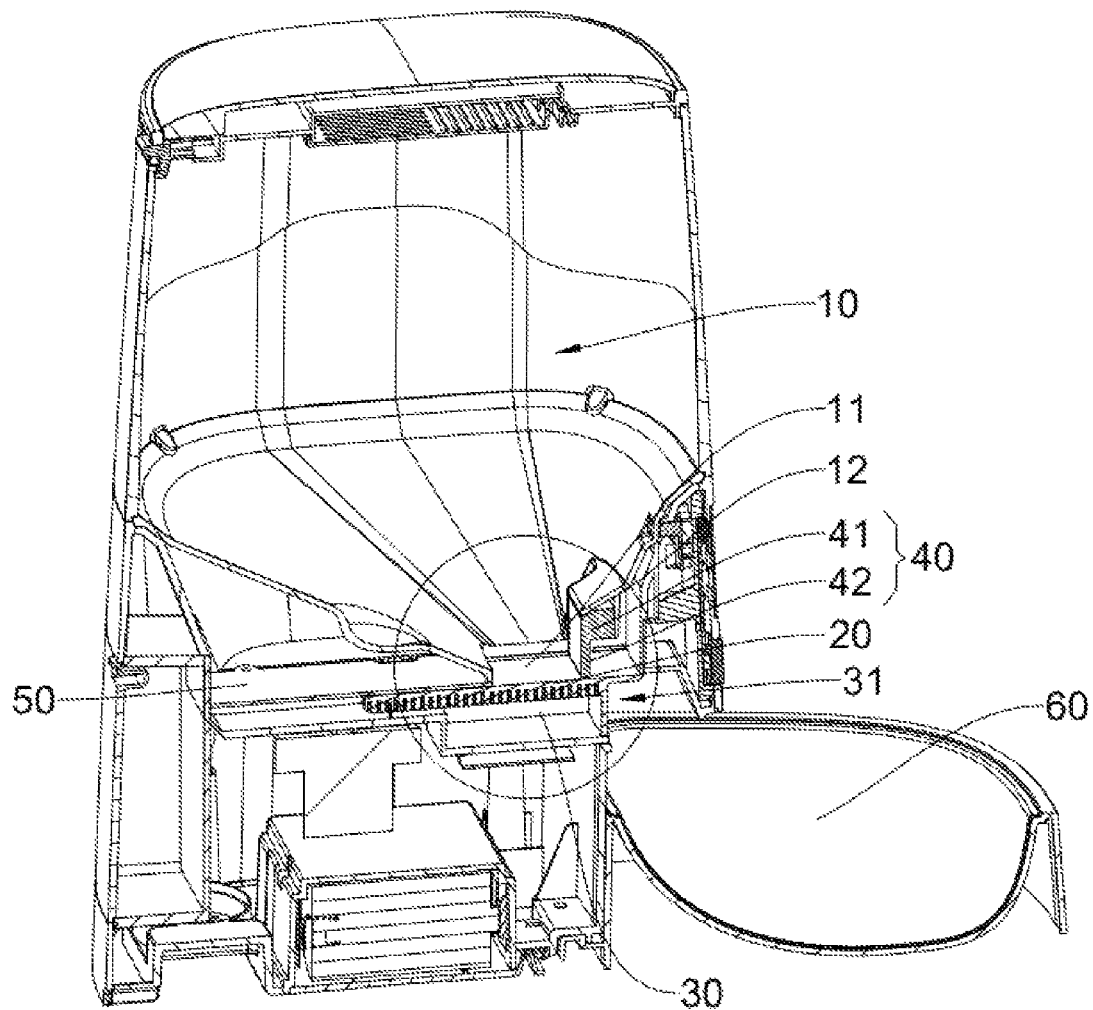
FIG. 4 is a schematic view of an automatic pet feeding device in accordance with an embodiment of the present disclosure.
Figure 5:
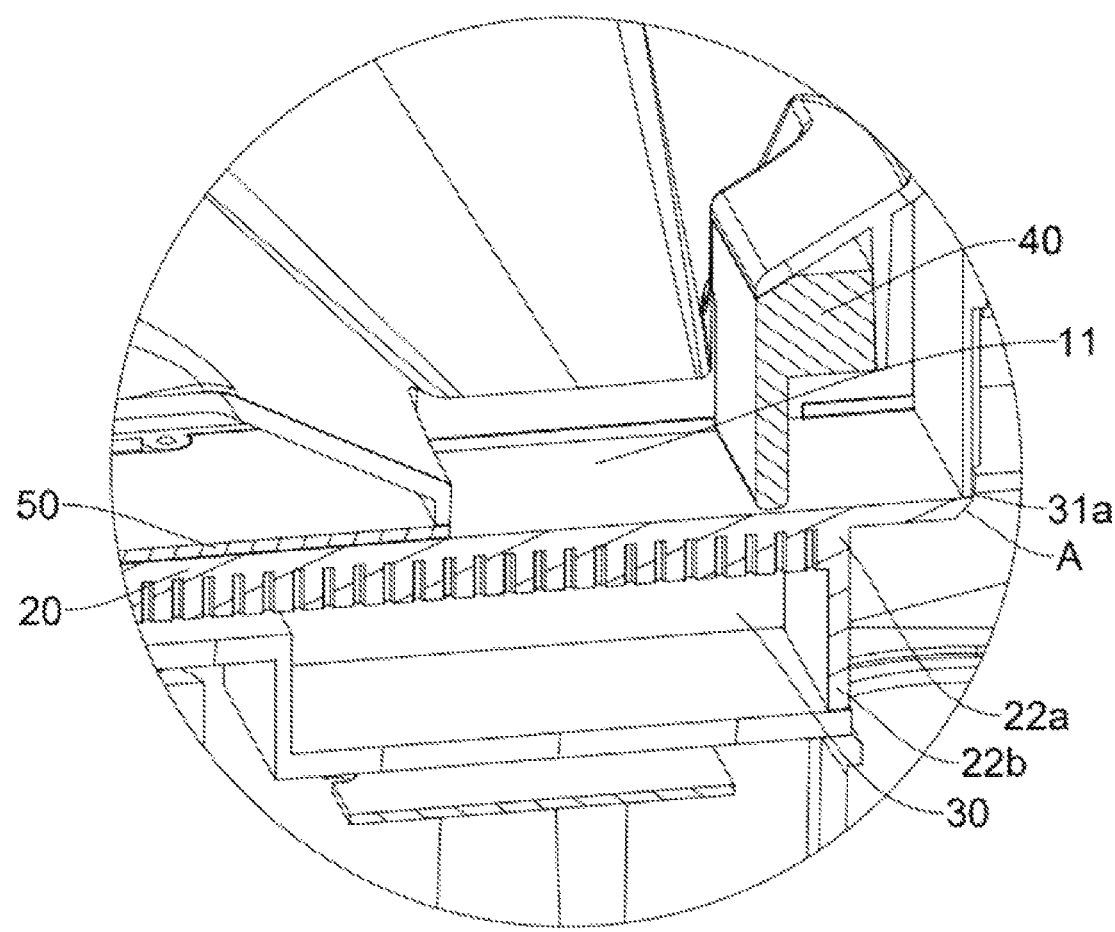
FIG. 5 is a partially enlarged view of a circle of FIG. 4.

The element labels according to the embodiment of the present disclosure shown as below:

10 grain storage bin, 11 grain leaking member, 111 third opening, 112 fourth opening, 12 recess, 20 grain pusher, 21 flat plate, 211 first end, 212 second end, A bevel, 22 pushing plate, 22a an end of the pushing plate, 22b opposite end of the pushing plate, 25 pushing bar, 251 first pushing portion, 252 second pushing portion, 30 pushing granary, 30a, side wall, 30b, an end of the pushing granary, 31 grain delivery member, 31a, farthest end, 311 first opening, 312 second opening, 32 bottom portion, 40 buffer, 41 insertion portion, 42 elongated portion, B guiding groove, 50 plate member, 60 grain bowl, 70 grain baffle, 71 baffling portion, 71a an end of the baffling portion, 72 rotating portion, 73 pushing rod, 73a end portion of the pushing rod, 731 arc portion, 732 flat portion, 80 flexible bar, 90 grain stirring bar.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should be understood that terms used in the description of the present disclosure herein are only for the purpose of describing specific embodiments and are not intended to limit the present disclosure. As used in the description of the present disclosure and the appended claims, "a", "an" and "the" in a singular form are intended to include plural forms, unless the context clearly indicates otherwise.

It should also be further understood that the term "and/or" used in the description of the present disclosure and the appended claims refers to and includes any and all possible combinations of one or more of the associated listed items.

Referring to FIGS. 4-8, an automatic pet feeding device according to an embodiment of the present disclosure includes a grain storage bin 10, a grain pusher 20 and a pushing granary 30. The grain pusher 20 is slidably arranged between the grain storage bin 10 and the pushing granary 30 to open and close the grain storage bin 10, push the pet food that flows into the pushing granary 30 when the grain storage bin 10 is opened, out of the pushing granary 30, and then close the grain storage bin 10 and the pushing granary 30 again.

Specifically, the grain storage bin 10 includes a grain leaking member 11 formed at a lower end thereof, so that the pet food can flow into the pushing granary 30 through the grain leaking member 11.

The pushing granary 30 is in communication with the grain leaking member 11, arranged below the grain storage bin 10 and includes a grain delivery member 31. In an embodiment of the present disclosure, a part of the grain pusher 20 extends into the pushing granary 30 and is configured to push the pet food that flows into the pushing granary 30, out of the grain delivery member 31 to be used by pets. After the pet food is used, the grain pusher 20 seals the grain leaking member 11 and the grain delivery member 31 to prevent insects and ants from entering inside the feeding device through the grain delivery member 31, to breed bacteria and endanger health of pets.

Specifically, when a user needs to add the pet food to the pet, the grain pusher 20 is pushed to move from the grain delivery member 31 to be away from the grain delivery member 31, at this time, the grain pusher 20 opens the grain delivery member 31 and the grain leaking member 11 so that the pet food flows from the grain leaking member 11 into the pushing granary 30. And then, the grain pusher 20 is further pushed to move towards the grain delivery member 31 so as to push the pet food out of the grain delivery member 31 for being used by pets. After the pet food is used, both the grain leaking member 11 and the grain delivery member 31 are sealed by the grain pusher 20 to prevent insects and ants from entering inside of the feeding device from the grain delivery member 31, to breed bacteria and endanger health of the pets.

In an embodiment of the present disclosure, the grain pusher 20 is set in a sliding way, both the grain delivery member 31 and the grain leaking member 11 are sealed by moving the grain pusher 20, so as to prevent insects and ants from entering inside of the feeding device from the grain delivery member 31, to breed bacteria and endanger health of the pets. In addition, a sliding setting mode can match with the pet food with different sizes on the market, and has better applicability; at the same time, it can prevent grain from being jammed.

Figure 6:
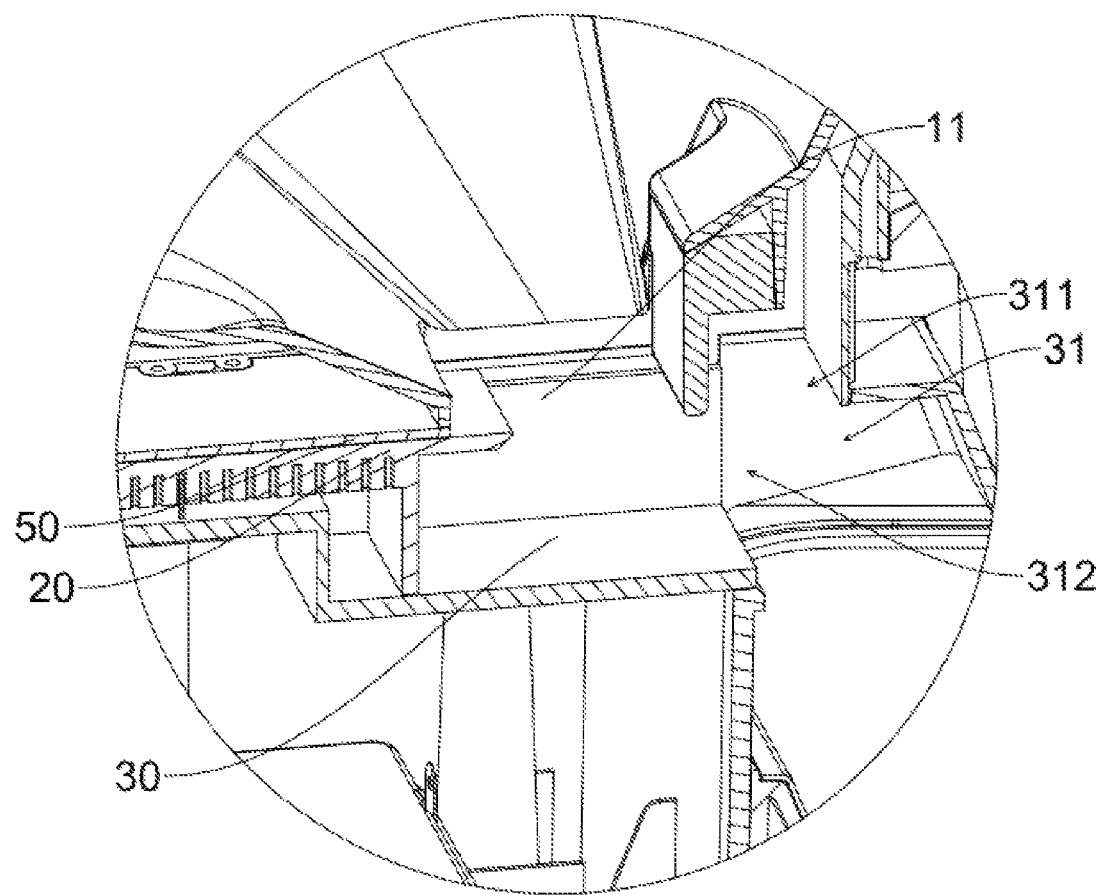
FIG. 6 is a schematic view of a grain pusher of the automatic pet feeding device of FIG. 4, shown after the grain pusher is moved.
Figure 7:
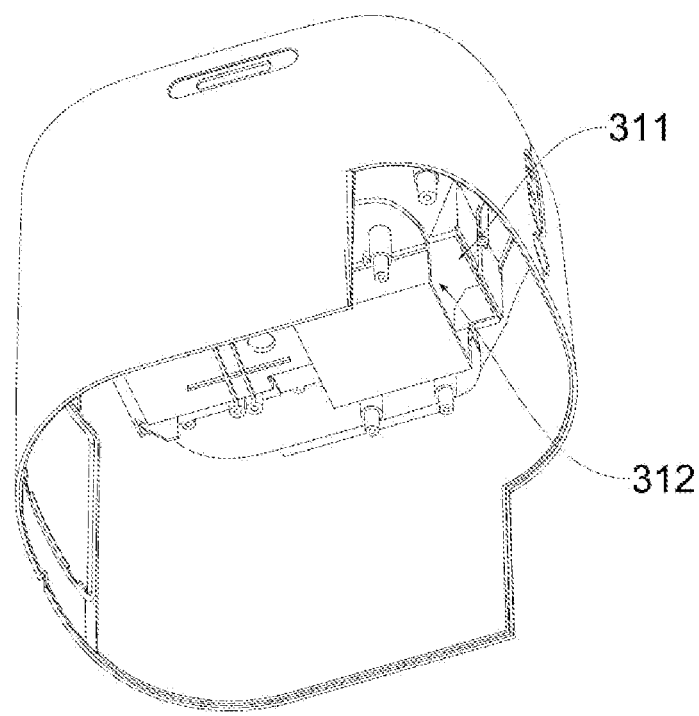
FIG. 7 is a schematic view of a grain delivery member of the automatic pet feeding device of FIG. 4.
Figure 8:
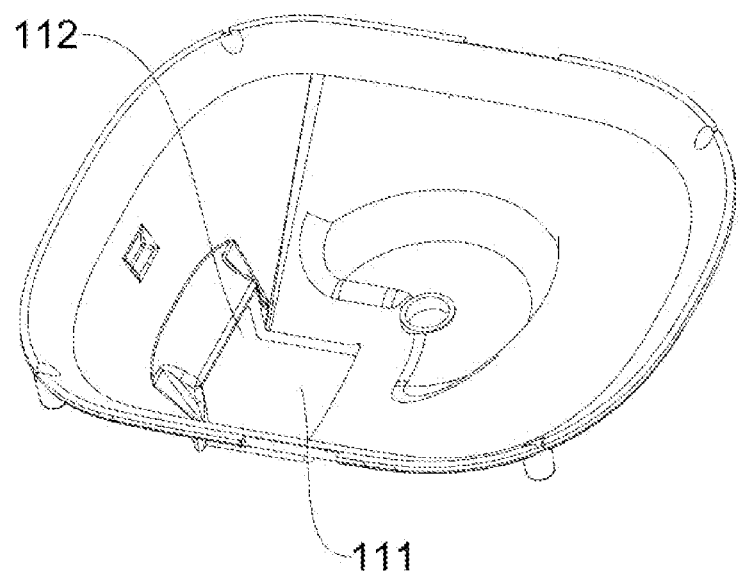
FIG. 8 is a schematic view of a grain leaking member of the automatic pet feeding device of FIG. 4.

Referring to FIG. 6 and FIG. 7, the grain delivery member 31 includes a first opening 311 arranged horizontally and a second opening 312 arranged vertically. The first opening 311 and the second opening 312 are connected with each other to form a "¬" shaped structure therebetween.

In an embodiment of the present disclosure, the grain delivery member 31 is arranged in a "¬" shaped structure, which can ensure that the pet food in the pushing granary 30 flows out quickly and at a maximum flow rate, and prevent the pet food from blocking the pushing granary 30; on the other hand, the grain delivery member 31 can cooperate with the grain pusher 20 to completely seal the feeding device.

Specifically, the grain pusher 20 includes a flat plate 21 and a pushing plate 22, the flat plate 21 including a first end 211 formed close to the grain delivery member 31, and a second end 212. An end 22a of the pushing plate 22 is connected with the flat plate 21 and an opposite end 22b of the pushing plate 22 extends into the pushing granary 30, a length of the pushing plate 22 is adapted to a depth of the pushing granary 30, that is, a bottom of the flat plate 21 abuts against the pushing granary 30, and at the same time, a length of the pushing plate 22 is consistent with a height of the grain delivery member 31. In particular, a connection position between the pushing plate 22 and the flat plate 21 is located near a middle of the flat plate 21, and the pushing plate 22 and the flat plate 21 jointly form a T-shaped structure therebetween. The grain pusher 20 is slidably connected between the grain storage bin 10 and the pushing granary 30, and a sliding direction of the grain pusher 20 is the same as or opposite to an outflow direction of the pet food in the pushing granary 30. The flat plate 21 opens and closes the grain leaking member 11 during movement. A depth of the pushing plate 22 is adapted to a depth of the pushing granary 30, so that the pushing plate 22 can push the pet food out of the pushing granary 30.

When in use, an initial state is that the grain leaking member 11 is sealed by the second end 212 of the flat plate 21, and both the first end 211 of the flat plate 21 and the pushing plate 22 cooperatively seal the grain delivery member 31. When the user needs to add the pet food, pushing the grain pusher 20 away from the grain delivery member 31, so that the flat plate 21 opens the grain leaking member 11 and the grain delivery member 31, in this way, the pet food flows into the pushing granary 30 from the grain leaking member 11. And then, the grain pusher 20 is further pushed to be close to the grain delivery member 31, at this time, the pushing plate 22 pushes the pet food in the pushing granary 30 to the grain delivery member 31, and then pushes the pet food outside, resulting in returning to the initial state.

An edge of the first opening 311 is leveled with the flat plate 21, and the second opening 312 is in communication with the first opening 311. A length of the first opening 311 is same as that of the first end 211, a height of the second opening 312 is same as that of the pushing plate 22. The edge of the first opening 311 is leveled with the flat plate 21, in this way, when the flat plate 21 moves to the first opening 311, the first opening 311 can be closed; the height of the second opening 312 is the same as that of the pushing plate 22 so that the second opening 312 can be closed by the pushing plate 22, so as to obtain an effect that the grain delivery member 31 is sealed by the pushing plate 22.

When the grain pusher 20 moves away from the grain delivery member 31, the flat plate 21 is close to a first end of the grain delivery member 31 so that the grain storage bin 10 is in communication with the pushing granary 30 to open the grain leaking member 11, and at the same time, the grain delivery member 31 is also opened in vertical and horizontal directions. When the storage bin 10 and the pushing granary 30 are connected under an action of the grain pusher 20, the pet food in the storage bin 10 can fall into the pushing granary 30 from the grain leaking member 11 under the action of its own gravity.

When the grain pusher 20 moves away from the grain delivery member 31, the first end 211 opens the first opening 311, and the pushing plate 22 synchronously opens the second opening 312, as the grain pusher 20 continues to move, the first end 211 gradually seals the grain leaking member 11.

In particular, when the grain pusher 20 moves towards the grain delivery member 31, the first end 211 of the flat plate 21 is close to the grain delivery member 31 so that the grain storage bin 10 and the pushing granary 30 are not connected, the grain leaking member 11 is closed, and the grain delivery member 31 is gradually closed in the vertical and horizontal directions. At the same time, the pet food in the pushing granary 30 flows out of the grain delivery member 31 under the action of movement of the pushing plate 22, so as to push the pet food.

That is to say, when the grain pusher 20 moves to the farthest end 31a of the grain delivery member 31, the first end 211 of the flat plate 21 close to the grain delivery member 31 is located at the first opening 311 to seal the first opening 311, the second end 212 of the flat plate part 21 away from the grain delivery member 31 seals the grain leaking member 11, and the pushing plate 22 also seals the second opening 312 after all the pet food in the grain storage bin 10 is pushed out of the grain delivery member 31.

At this time, both the first opening 311 of the grain delivery member 31 and the grain leaking member 11 of the grain storage bin 10 are sealed by the flat plate 21 of the grain pusher 20 at the same time, and the second opening 312 of the grain delivery member 31 is sealed by the pushing plate 22 that pushes the pet food, thus a double sealing of the grain leaking member 11 and the grain delivery member 31 is implemented, and the grain delivery member 31 is fully sealed in the horizontal and vertical directions.

In an embodiment of the present disclosure, the grain pusher 20 is arranged between the grain storage bin 10 and the pushing granary 30 in a sliding mode. In this way, a size requirement of the grain pusher 20 is relatively low, for example, the grain pusher 20 with different lengths can be installed. A purpose of opening and closing the grain leaking member 11 and the grain delivery member 31 can be realized only by controlling a moving travel of the grain pusher 20, which can be suitable for the pet food with different sizes and have stronger applicability thereof.

In an embodiment of the present disclosure, a structure design of the feeding device is ingenious, the pet food in the pushing granary 30 is pushed by the pushing plate 22 and the flat plate 21, the grain delivery member 31 can be completely sealed in both directions, and at the same time, the flat plate 21 seals the grain leaking member 11 of the storage granary 10. Compared with a conventional method that only the grain storage bin 10 is sealed, such double sealing way of the present disclosure can effectively prevent external insects and ants from entering the pushing granary 30 and the grain storage bin 10 from the grain delivery member 31 to pollute the pet food, so that the pet food can be kept for a long time without moisture. In addition, the present disclosure can control an actual conduction size of the grain leaking member 11 by controlling the moving travel of the grain pusher 20, so as to facilitate the pet food with different sizes to enter the pushing granary 30 from the grain leaking member 11, and further control the conduction time to achieve the purpose of quantitative delivery.

In an embodiment of the present disclosure, the pushing plate 22 also acts as a supporting role during moving the grain pusher 20, and is configured to support the pet food above the pushing plate 22, so as to prevent the flat plate 21 from deforming to influence a pushing effect thereof.

Furthermore, the grain delivery member 31 of the present disclosure adopts a two-dimensional opening mode in the vertical and horizontal directions, which can ensure outflow of the pet food to the maximum extent and the maximum flow rate, and no problem of blockage is occurred due to too fast pushing speed.

In an embodiment of the present disclosure, the first opening 311 is coplanar with the flat plate 21, that is, a height of the first opening 311 is set to just ensure that the first end 211 of the flat plate 21 close to the grain delivery member 31 completely abuts against an upper end surface of the first opening 311 when the first end 211 moves to the farthest end 31a of the grain delivery member 31, thereby ensuring the sealing effect thereof.

When the automatic pet feeding device of the present disclosure is used to add the pet food, the grain pusher 20 moves to be close to the farthest end 31a of the grain delivery member 31, both the grain leaking member 11 and the grain delivery member 31 are completely sealed, when the pet food is added into the grain storage bin 10, the grain pusher 20 moves away from the grain delivery member 31, both the grain leaking member 11 and the grain delivery member 31 are gradually opened, and the pet food flows out of the grain delivery member 31 from the grain storage bin 10. When a feeding amount of the pet food reaches a preset value, the grain pusher 20 moves towards the grain delivery member 31, during the movement of the grain pusher 20, the flat plate 21 gradually seals the grain leaking member 11, and the pushing plate 22 also synchronously pushes the remaining pet food in the pushing granary 30 out of the grain delivery member 31. Along with the movement of the grain pusher 20, the grain leaking member 11 is completely sealed. After the pushing plate 22 completely pushes the pet food out of the pushing granary 30, the pushing plate 22 has moved to the second opening 312 of the grain delivery member 31 to seal the second opening 312, and the first end 211 of the flat plate 21 close to the grain delivery member 31 is also located in the first opening 311 and abutted against the upper end face of the first opening 311, that is, after the pushing plate 22 pushes all the pet food out of the pushing granary 30, the grain delivery member 31 is just sealed in two directions.

In a next feeding of the pet food, the grain pusher 20 moves away from the grain delivery member 31 again to realize the feeding, and repeat the above actions.

In an optional embodiment of the present disclosure, the automatic pet feeding device also includes a buffer 40 vertically arranged on a side of the grain leaking member 11 close to the grain delivery member 31, the buffer 40 is in a long-strip shape. The grain leaking member 11 also includes a third opening 111 and a fourth opening 112 connected with the third opening 111. The fourth opening 112 is arranged above the third opening 111 and is connected with the pushing granary 30. A cross section of the grain leaking member 11 is L-shaped. The third opening 111 is parallel to a plane that the flat plate 21 is located in, the buffer 40 installed in the fourth opening 112, the grain storage bin 10 includes a recess 12 close to the fourth opening 112, one end of the buffer 40 inserted into the recess 12 to block the fourth opening 112.

In an embodiment of the present disclosure, when both the grain leaking member 11 and the grain delivery member 31 are opened, the pet food located in the grain storage bin 10 flows out from the grain leaking member 11 and the grain delivery member 31. A part of the pet food that flows out is in contact with the buffer 40 during the flow, the buffer 40 acts as a barrier to prevent the pet food from passing through the grain delivery member 31 and then flowing directly from the grain leaking member 11 with a great angle and a great direction, resulting in the pet food that flows from the grain delivery member 31 dispersing into a large space and being difficult to be gathered together, so that the pet food can't be effectively held in a feeding container.

Furthermore, the buffer 40 includes an insertion portion 41 and an elongated portion 42 connected with the insertion portion 41, a thickness of the insertion portion 41 along a moving direction of the grain pusher 20 is greater than a thickness of the elongated portion 42 along the moving direction of the grain pusher 20, and the insertion portion 41 fixed in the recess 12.

In an embodiment of the present disclosure, a bottom end of the elongated portion 42 is consistent with an edge height of the fourth opening 112 of the grain leaking member 11, on the one hand, the flowing pet food can be pushed during the movement of the grain pusher 20 to prevent the pet food from flowing out of the gap between the grain pusher 20 and the buffer 40, at the same time, it can cooperate with the edge of the fourth opening 112 to seal the grain leaking member 11, which also ensures a smooth movement of the grain pusher 20 without hindering the grain pusher 20. On the other hand, the grain leaking member 11 is arranged in an inserting mode instead of being additionally arranged on the outside of the grain pusher 20, so that the whole grain storage bin 10 can be ensured to be smaller in a size, and the height of the grain pusher 20 is not increased.

In an embodiment of the present disclosure, the long strip-shaped buffer 40 serves a purpose of preventing some pet food from directly flowing from the grain leaking member 11 and the grain delivery member 31. At the same time, the thicker insertion portion 41 is fixed in the recess 12 to ensure a fixing strength of the buffer 40 and improve an impact resistance of the buffer 40 that comes from the flowing pet food.

In an embodiment of the present disclosure, the grain storage bin 10 includes a grain stirring bar 90, when the grain stirring bar 90 rotates, the pet food stored in the grain storage bin 10 flows out through the grain leaking member 11 along with the stirring, the grain stirring bar 90 pushes the pet food in the grain storage bin 10 to the grain leaking member 11, which is conducive to the pet food falling into the pushing granary 30 from the grain leaking member 11.

In an embodiment of the present disclosure, under an action of the grain stirring bar 90, the pet food flows out of the grain leaking member 11 faster, at this time, the buffer 40 has a more obvious blocking effect, which can ensure that the pet food flowing out of the grain delivery member 31 is relatively concentrated. The thicker insertion portion 41 is fixed in the recess 12, which further ensures the fixing strength of the buffer 40 and can be adapted to a higher speed flow of the pet food.

In some preferred embodiments, the buffer 40 is made of a soft material. The buffer 40 made of the soft material can play as a buffer role in the process of the pet food flowing from the grain leaking member 11, the effect of preventing the pet food from flowing directly from the grain delivery member 31 is more obvious, which can withstand a greater impact from the pet food.

The buffer 40 made of the soft material in the present disclosure has another more important beneficial effect, that is, when the grain pusher 20 moves towards the grain delivery member 31, a blockage between the grain pusher 20 and the buffer 40 can be prevented.

Specifically, in the process of that the grain pusher 20 moves towards the grain delivery member 31, as a distance between a tip position of the flat plate 21 close to the grain delivery member 31 and the buffer 40 gradually decreases, the pet food flowing from the elongated portion 42 of the buffer 40 and the tip position of the flat plate 21 collides with the elongated portion 42, and the elongated portion 42 pushes the collided pet food to move in a small range along an opposite direction that the pet food flows under an elastic action of the elongated portion 42, that is, moving towards the grain storage bin 10, so that the pet food moving towards the inside of the grain storage bin 10 and the pet food flowing out of the grain storage bin 10 interact with each other, which is beneficial to ensuring that the pet food flowing out from the grain leaking member 11 is in a loose state, thereby preventing blockage thereof. Meanwhile, part of the pet food acted by the buffer 40 can be ejected to the upper surface of the flat plate 21 under the action of the buffer 40, namely, in the grain storage bin 10, the pet food which is difficult to directly pass through the buffer 40 can't be gathered in a small space, and therefore a phenomenon of grain blocking can be avoided.

Another most important state is that in the process of moving the grain pusher 20 towards the grain delivery member 31, as the distance between the tip position of the flat plate 21 close to the grain delivery member 31 and the buffer 40 gradually decreases, some pet food with larger sizes are clamped in an area between the tip position of the flat plate 21 and the buffer 40. When the grain pusher 20 continues to move, the buffer 40 generates elastic deformation towards the grain delivery member 31, at this time, the buffer 40 acts on the pet food with the larger sizes to spring away the pet food with the larger sizes, so as to ensure that the grain pusher 20 can move further and prevent blockage thereof.

In a preferred embodiment of the present disclosure, a bevel A facing the pushing granary 30 is also included at an end of the grain pusher 20 towards the grain delivery member 31. At this time, when the pet food with the larger size is clamped on the buffer 40 and the tip position of the grain pusher 20 near the grain delivery member 31, the pet food can be bounced into the pushing granary 30 along the bevel A under the action of the buffer 40.

Figure 9:
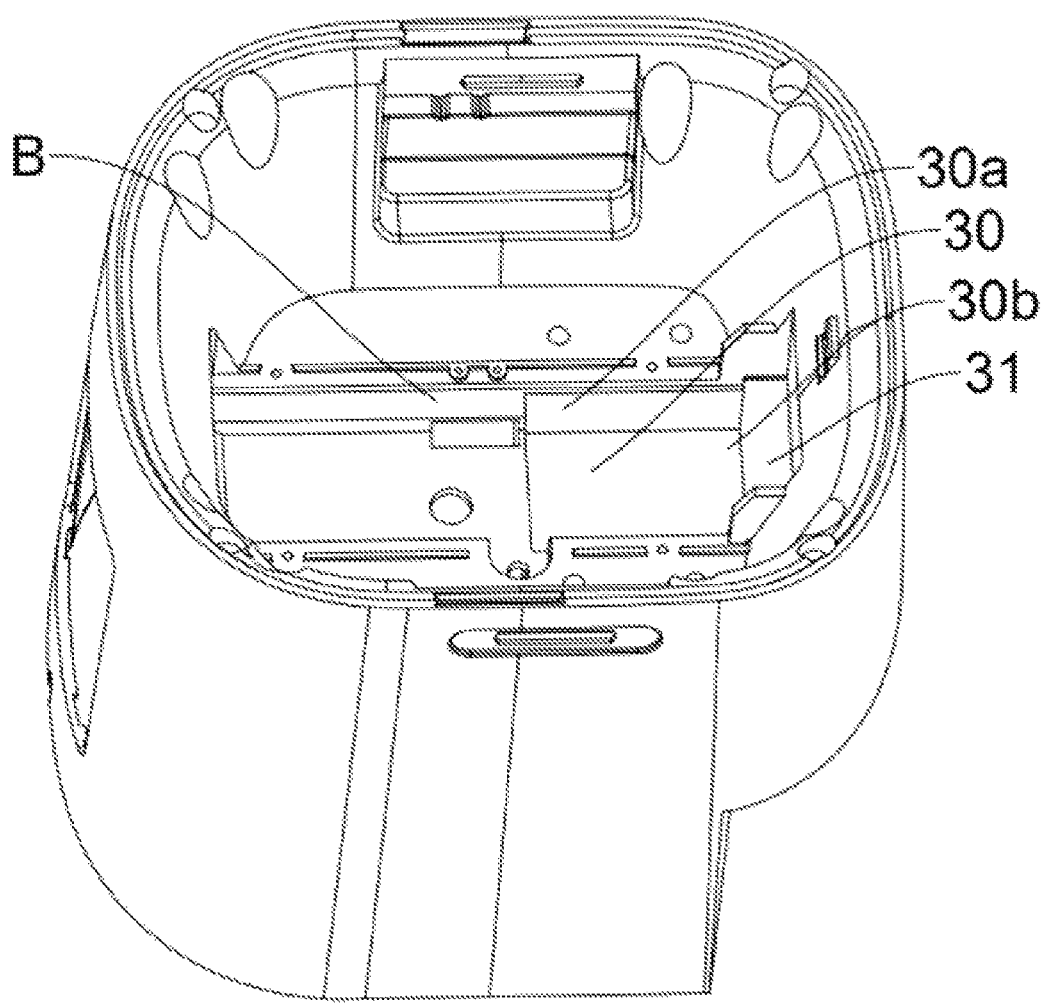
FIG. 9 is a schematic view of an installation position of the grain pusher of the automatic pet feeding device of FIG. 4.

Referring to FIG. 9, in an optional embodiment, a guiding groove B is formed on a side wall 30a of the pushing granary 30, a width of the guiding groove B is adapted to that of the flat plate 21, and the flat plate 21 is placed in the guiding groove B. The pushing granary 30 is arranged at an end of a bottom wall of the guiding groove B, and the grain delivery member 31 is arranged at an end 30b of the pushing granary 30. In an optional embodiment, the grain pusher 20 is also provided with a plate member 50, a lower surface of the plate member 50 abuts against the grain pusher 20, and an upper surface of the plate member 50 abuts against the bottom of a horizontal opening of the grain leaking member 11, so that the grain pusher 20 is vertically limited, and the grain pusher 20 can horizontally move in the guiding groove B.

In an optional embodiment, the automatic pet feeding device of the present disclosure further includes a grain bowl 60 arranged below the grain delivery member 31, so that the pet food can fall into the grain bowl 60 from the grain delivery member 31 for pets to eat. A distance between the grain bowl 60 and the grain delivery member 31 is enough great in the present disclosure, so as to avoid an occurrence of pet food blockage.

Figure 10:
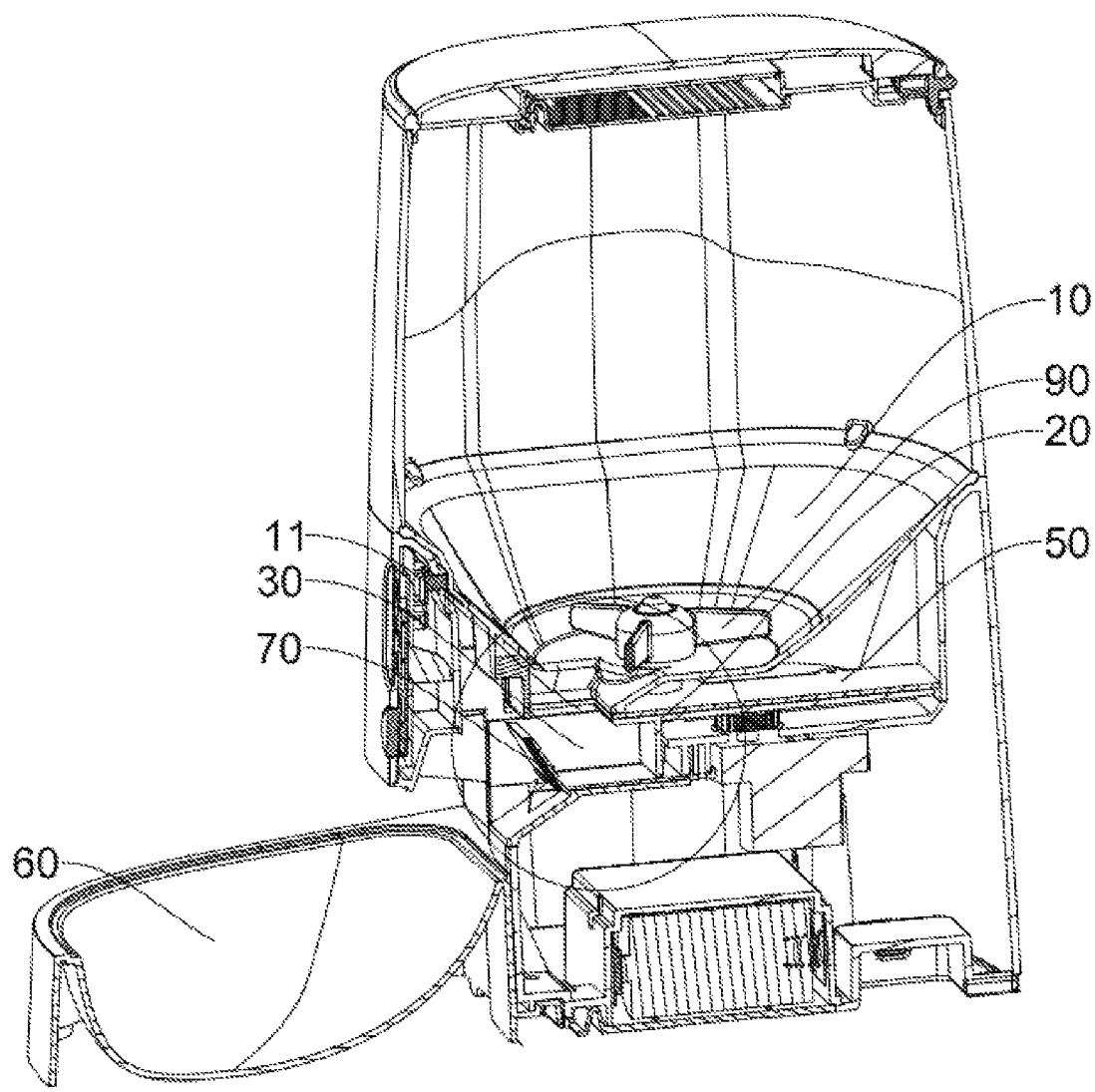
FIG. 10 is similar to FIG. 4, but shown from another view.
Figure 11:
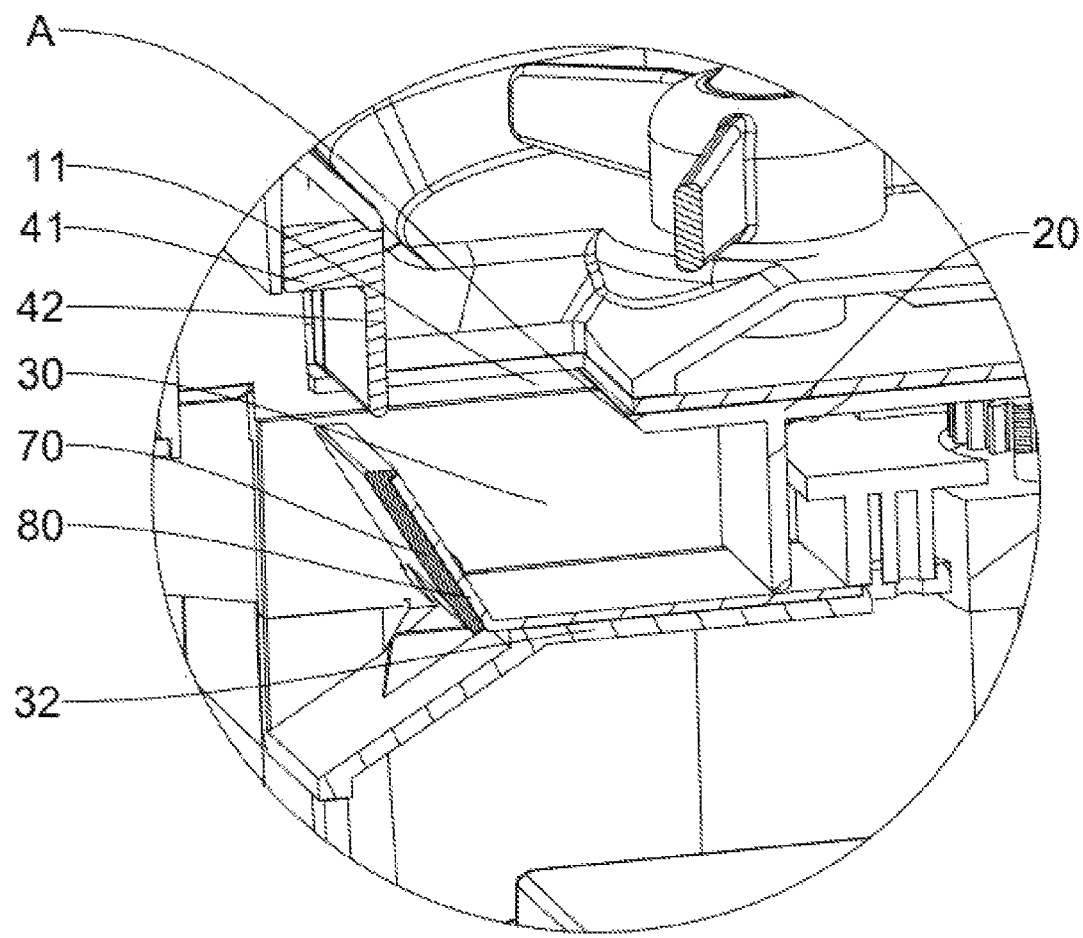
FIG. 11 is a partially enlarged view of a circle of FIG. 10.
Figure 12:
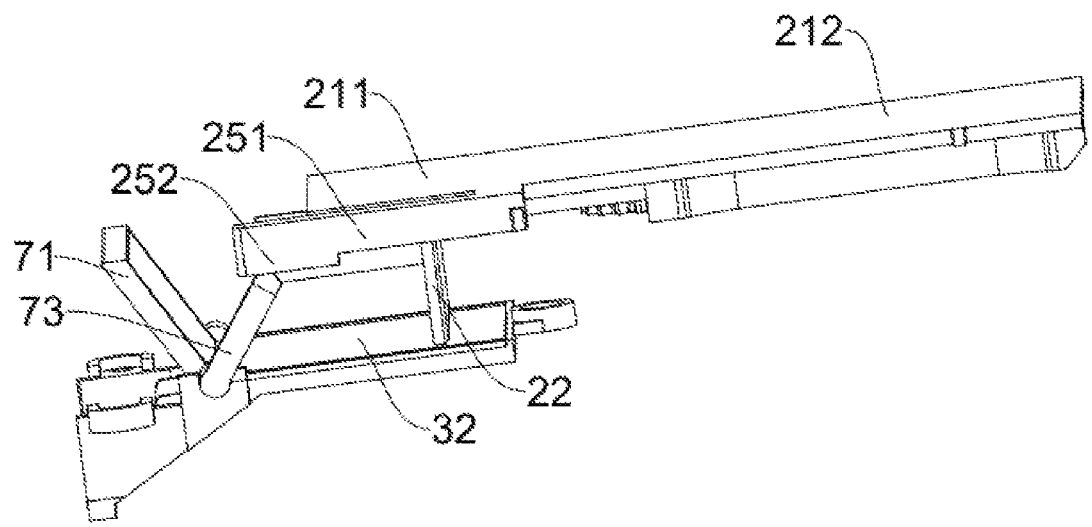
FIG. 12 is a schematic view of the automatic pet feeding device of FIG. 4, shown that a grain baffle of the automatic pet feeding device is closed.
Figure 13:
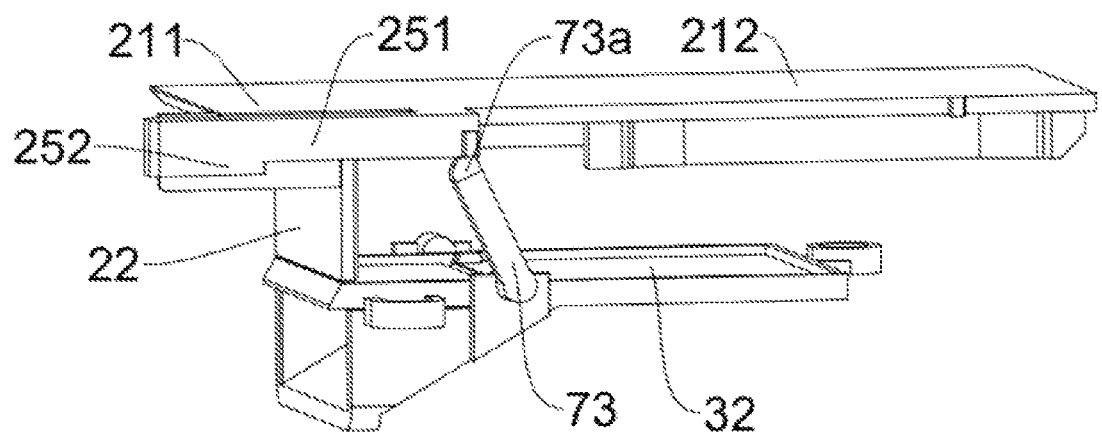
FIG. 13 is similar to FIG. 12, but shown the grain baffle is opened.
Figure 14:
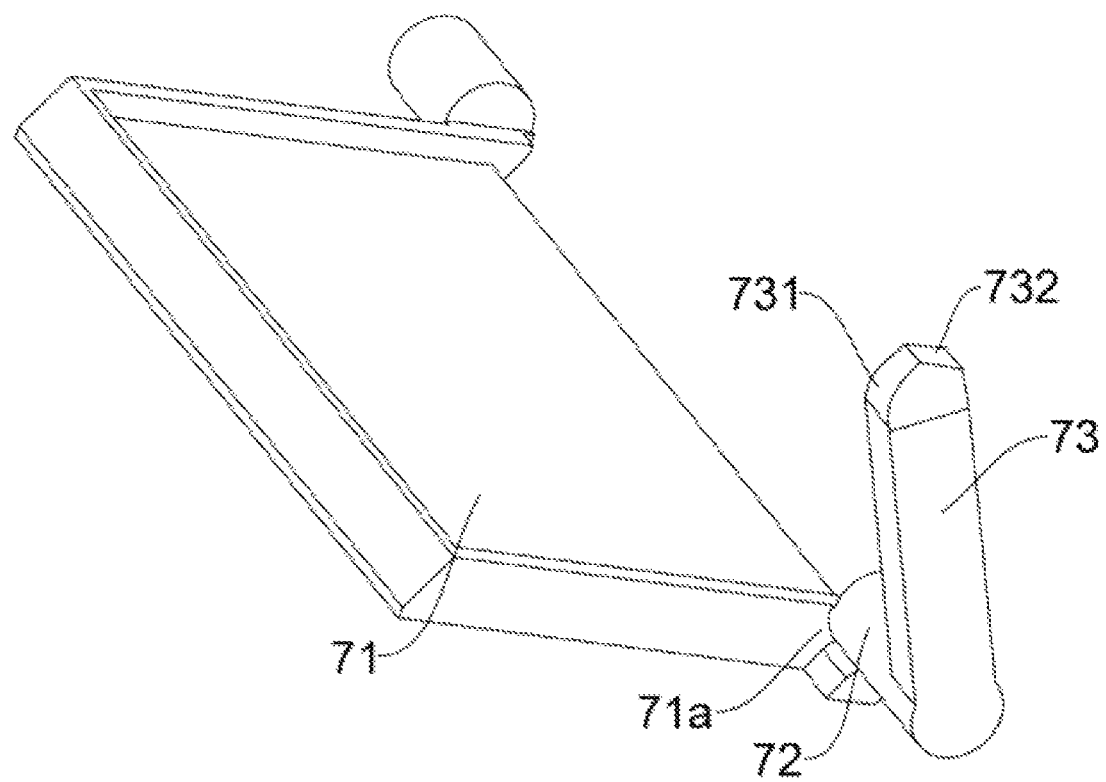
FIG. 14 is a schematic view of the grain baffle of the automatic pet feeding device of FIG. 4.
Figure 15:
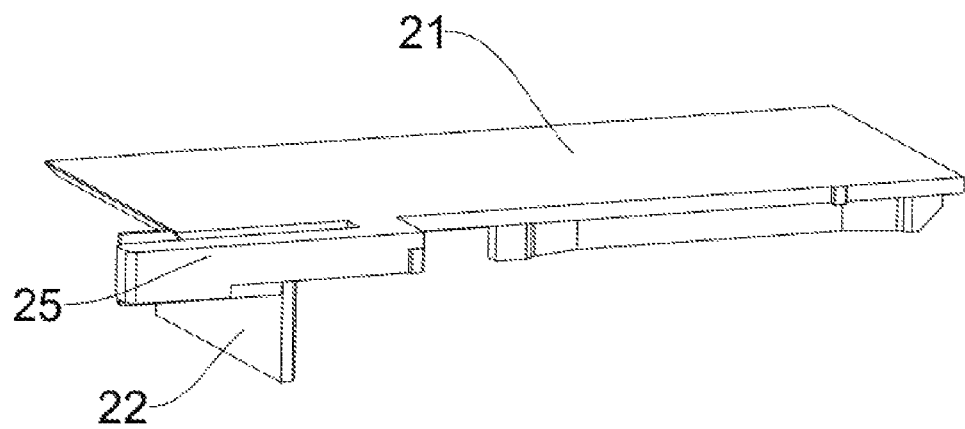
FIG. 15 is a schematic view of the grain pusher of the automatic pet feeding device of FIG. 4.

Referring to FIG. 10 and FIG. 11, in an optional embodiment, the automatic pet feeding device of the present disclosure further includes a grain baffle 70 arranged close to the grain delivery member 31 and configured to open and close the grain delivery member 31. When the pushing granary 30 is in communication with the grain leaking member 11, the grain delivery member 31 is closed by the grain baffle 70. When the pushing granary 30 is connected with the grain leaking member 11, the pet food in the grain storage bin 10 leaks into the pushing granary 30 from the grain leaking member 11, at this time, the grain baffle 70 closes the grain delivery member 31 to prevent the pet food from leaking out of the grain delivery member 31, so that an amount of the pet food that is pushed out of the pushing granary 30 by the grain pusher 20 is fixed every time. When the pushing granary 30 is not connected with the grain leaking member 11, the grain delivery member 31 is opened at this time, the grain pusher 20 can push the pet food in the pushing granary 30 out of the grain delivery member 31, so as to control the pet food output from the grain delivery member 31 every time and ensure the healthy and regular diet of the pets. Referring to FIGS. 12-15, the grain baffle 70 includes a baffling portion 71, a rotating portion 72 and a pushing rod 73, the rotating portion 72 arranged at an end 71a of the baffling portion 71, and the pushing rod 73 connected to the rotating portion 72; the rotating portion 72 rotationally arranged at a bottom portion 32 of the pushing granary 30, and an angle formed between the pushing rod 73 and the baffling portion 71. The grain pusher 20 includes a pushing bar 25 corresponding to the pushing rod 73. When the grain pusher 20 moves along the direction towards or away from the grain delivery member 31, the pushing bar 25 pushes the pushing rod 73, thereby pushing the rotating portion 72 and the baffling portion 71 to rotate, so that the baffling portion 71 opens and closes the grain delivery member 31. When the grain delivery member 31 is opened, the baffling portion 71 is parallel to a bottom wall of the pushing granary 30, at this time, the pushing granary 30 and the baffling portion 71 cooperatively form an open cavity with an opening, so that the pet food in the pushing granary 30 can be pushed out of the pushing granary 30 by the grain pusher 20. When the baffling portion 71 closes the grain delivery member 31, the included angle is formed between the baffling portion 71 and the bottom wall of the pushing granary 30. At this time, the baffling portion 71 and the pushing granary 30 will cooperatively form a closed cavity therebetween, the pet food leaked from the grain leaking member 11 into the pushing granary 30 can only be stored in the closed cavity that is formed by the baffling portion 71 and the pushing granary 30, in this way, the amount of the pet food flowing into the pushing granary 30 every time is fixed, so as to achieve the effect of quantitative feeding. All the baffling portion 71, the rotating portion 72 and the pushing rod 73 are integrally formed.

Referring to FIGS. 12-15, the pushing bar 25 includes a first pushing portion 251 and a second pushing portion 252 connected with each other, the second pushing portion 252 arranged close to the grain delivery member 31, and a thickness of the second pushing portion 252 that is towards the pushing rod 73 greater than a thickness of the first pushing portion 251 that is towards the pushing rod 73. The pushing rod 73 includes an arc portion 731 and a flat portion 732 arranged on an end portion 73a thereof. The arc portion 731 is arranged close to the grain delivery member 11, and the flat portion 732 is connected with the arc portion 731. A distance between a position where the arc portion 731 is connected with the flat portion 732 and the rotating portion 72 is longer than a distance between other positions where the arc portion 731 is connected with the flat portion 732 and the rotating portion 72. When the grain baffle 70 is opened, the flat portion 732 of the pushing rod 73 is in contact with the first pushing portion 251 of the pushing bar 25, and the grain pusher 20 moves towards the inside of the grain delivery member 31, at this time, the flat portion 732 moves along the first pushing portion 251 until the second pushing portion 252 moves to the pushing rod 73. An end face of the second pushing portion 252 hooks the pushing rod 73 to rotate, and the grain pusher 20 continues to move until the arc portion 731 of the pushing rod 73 is in contact with a side of the second pushing portion 252 towards the pushing rod 73, at this time, the grain baffle 70 closes the grain delivery member 31, and the arc portion 731 of the pushing rod 73 moves along the second pushing portion 252.

When the grain delivery member 31 is opened, the grain pusher 20 moves towards the grain delivery member 31, a position of the second pushing portion 252 towards the pushing rod 73 is in contact with the arc portion 731 of the pushing rod 73, and the arc portion 731 will not affect the movement of the pushing bar 25 when the second pushing portion 252 moves towards a side of the pushing rod 73, that is, the arc portion 731 will not jam the second pushing portion 252. After the second pushing portion 252 completely moves over the pushing rod 73, the pushing rod 73 perfectly transitions to the first pushing portion 251 of the pushing bar 25, and is in contact with the first pushing portion 251. At this time, the baffling portion 71 is leveled with the bottom portion 32 of the pushing granary 30, the grain delivery member 31 is opened, and the grain pusher 20 continuously pushes the pet food out of the pushing granary 30 completely.

Furthermore, the feeding device further includes a flexible bar 80 arranged on the baffling portion 71 and the bottom portion 32 of the pushing granary 30. When the baffling portion 71 rotates, a gap is formed between the baffling portion 71 and the bottom portion 32 of the pushing granary 30. By setting the flexible bar 80, fragments of the pet food can be prevented from leaking out of the gap. The flexible bar 80 is made of a flexible material, and a position of the flexible bar 80 corresponding to the baffling portion 71 can rotate along with the baffling portion 71. A thickness of the flexible bar 80 is relatively thin, for example, the thickness of the flexible bar 80 is 1 mm, in this way, the flexible bar 80 will not affect the rotation of the baffling portion 71.

When the automatic pet feeding device of the present disclosure is used, first adding the pet food into the grain storage bin 10 for standby, at this time, the grain pusher 20 closes the grain leaking member 11 and the grain delivery member 31, so that the pet food can't be leaked from the grain leaking member 11 to the pushing granary 30. When needing to feed the pet, pushing the grain pusher 20 away from the grain delivery member 31, so that the pushing granary 30 is connected with the grain storage bin 10, and the grain leaking member 11 and the grain delivery member 31 are opened by the grain pusher 20. When the grain delivery member 31 is fully opened by the grain pusher 20, the pushing bar 25 of the grain pusher 20 pushes the grain baffle 70, so that the grain baffle 70 is arranged at the included angle with the bottom wall of the pushing granary 30 to seal the pushing granary 30. At this time, the pet food leaks into the pushing granary 30 from the grain leaking member 11, so as to ensure that the pet food that is leaked into the pushing granary 30 every time does not exceed a volume of the pushing granary 30, so as to achieve the effect of quantitative feeding. And then, the grain pusher 20 is pushes towards the grain delivery member 31, in this movement, the pushing plate 22 of the grain pusher 20 pushes the pet food in the pushing granary 30 to the grain delivery member 31, and the pushing bar 25 of the grain pusher 20 pushes the grain baffle 70 until the grain baffle 70 rotates to be parallel to the bottom wall of the pushing granary 30, to open the grain delivery member 31, the grain pusher 20 is continued to be pushed until the pet food is pushed into the external grain bowl 60, thereby feeding the pets.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure. Therefore, the protection scope of the present disclosure shall be subject to the protection scope of the claims.

What is claimed is:
1. An automatic pet feeding device comprising:
a grain storage bin comprising a grain leaking member formed at a lower end thereof;
a pushing granary arranged below the grain storage bin and comprising a grain delivery member, the pushing granary in communication with the grain leaking member;
a grain pusher slidably arranged between the grain storage bin and the pushing granary; and wherein
the grain pusher is configured to push pet food in the pushing granary out of the grain delivery member, and open or close the grain leaking member and the grain delivery member; and wherein
the feeding device further comprises: a grain baffle arranged close to the grain delivery member and configured to open and close the grain delivery member; when the pushing granary is in communication with the grain leaking member, the grain delivery member is closed by the grain baffle, and when the pushing granary is not connected with the grain leaking member, the grain delivery member is opened by the grain baffle; and wherein
the grain baffle comprises a baffling portion, a rotating portion and a pushing rod, the rotating portion arranged at an end of the baffling portion, and the pushing rod connected to the rotating portion; the rotating portion rotationally arranged at a bottom portion of the pushing granary; the grain pusher comprising a pushing bar corresponding to the pushing rod; and wherein
the pushing bar comprises a first pushing portion and a second pushing portion connected with the first pushing portion, the second pushing portion arranged close to the grain delivery member, and a thickness of the second pushing portion that is towards the pushing rod greater than a thickness of the first pushing portion that is towards the pushing rod; the pushing rod comprising an arc portion arranged close to the grain delivery member, and a flat portion connected with the arc portion.

2. The automatic pet feeding device as claimed in claim 1, wherein the grain pusher comprises:
a flat plate comprising a first end close to the grain delivery member, and a second end;
a pushing plate with an end connecting to a middle of the flat plate and an opposite end extending into the pushing granary, and the pushing plate configured to push the pet food in the pushing granary; and
both the first end and the pushing plate configured to seal the grain delivery member, and the flat plate configured to open or close the grain leaking member.

3. The automatic pet feeding device as claimed in claim 2, wherein a guiding groove is arranged on a side wall of the pushing granary, the flat plate received in the guiding groove and moving horizontally in the guiding groove, and the grain delivery member arranged at an end of the pushing granary.

4. The automatic pet feeding device as claimed in claim 2, wherein the grain delivery member is a three-dimensional-opening structure, and comprises:
a first opening horizontally arranged on the grain delivery member, an edge of the first opening leveled with the flat plate;
a second opening vertically arranged on the grain delivery member, and in communication with the first opening; and wherein
when the grain pusher moves to a farthest end towards the grain delivery member, the second opening is sealed by the pushing plate, the first opening is sealed by the first end, and the grain leaking member is sealed by the second end.

5. The automatic pet feeding device as claimed in claim 2, wherein the grain leaking member is a three-dimensional-opening structure and comprises:
a third opening arranged above the pushing granary and in communication with the pushing granary;
a fourth opening connected with the third opening, and the third opening in parallel arranged on a plane where the flat plate is located.

6. The automatic pet feeding device as claimed in claim 1, wherein the feeding device further comprises:
a buffer with a long-strip shape arranged on a side of the grain leaking member close to the grain delivery member;
the buffer configured to block part of the pet food in the grain storage bin.

7. The automatic pet feeding device as claimed in claim 6, wherein the buffer comprises an insertion portion and an elongated portion, a thickness of the elongated portion along a moving direction of the grain pusher less than that of the insertion portion along the moving direction of the grain pusher, and the elongated portion configured to prevent the pet food from flowing out of a gap between the grain pusher and the buffer.

8. The automatic pet feeding device as claimed in claim 6, wherein the buffer is made of a flexible material, and is elastically deformed to push the pet food between the buffer and the grain pusher to prevent the pet food from being jammed.

9. The automatic pet feeding device as claimed in claim 6, wherein a bevel is arranged on an end of the grain pusher towards the grain delivery member, the bevel configured to prevent large-size pet food from being jammed between the buffer and the grain pusher.

10. The automatic pet feeding device as claimed in claim 6, wherein the feeding device further comprises:
a grain bowl detachably connected below the grain delivery member, and the pet food in the grain storage bin passing through a gap between the grain pusher and the buffer when the grain pusher is retracted away from the grain delivery member, and then flowing into the grain bowl.

11. The automatic pet feeding device as claimed in claim 1, wherein the pushing bar pushes the pushing rod so that the baffling portion rotates to open or close the grain delivery member; when the grain delivery member is opened by the baffling portion, the baffling portion is parallel to the bottom portion of the pushing granary; when the grain delivery member is closed by the baffling portion, an angle is formed between the baffling portion and the bottom portion of the pushing granary, the baffling portion pushes the pushing granary to be closed.

12. The automatic pet feeding device as claimed in claim 1, wherein when the grain baffle is opened, the flat portion of the pushing rod in contact with the first pushing portion of the pushing bar; when the grain baffle is closed, the second pushing portion in contact with the arc portion of the pushing rod; during the grain pusher moving away from the grain delivery member, the first pushing portion in contact with the flat portion until the second pushing portion moves to the pushing rod to hook the pushing rod, to drive the pushing rod and the baffling portion to rotate, so that the pushing granary is closed by the baffling portion; during the grain pusher moving close to the grain delivery member, the second pushing portion drives the pushing rod and the baffling portion to rotate, so that the pushing granary is opened by the baffling portion.

13. The automatic pet feeding device as claimed in claim 1, wherein the feeding device further comprises a flexible bar arranged on the baffling portion and a bottom of the pushing granary.

* * * * *